United States Patent
Ross (10) Patent No.: US 8,838,498 B2
(45) Date of Patent: Sep. 16, 2014

(54) SOCIAL NETWORK PLATFORM FOR UNDERWRITING

(75) Inventor: Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 121 days.

(21) Appl. No.: 13/103,624

(22) Filed: May 9, 2011

(65) Prior Publication Data

US 2012/0290329 A1 Nov. 15, 2012

(51) Int. Cl.
*G06Q 40/00* (2012.01)
*G06Q 50/00* (2012.01)

(52) U.S. Cl.
CPC ............... *G06Q 40/00* (2013.01); *G06Q 50/01* (2013.01)
USPC .............................................. 705/38; 705/35

(58) Field of Classification Search
USPC ..................................................... 705/35, 38
See application file for complete search history.

(56) References Cited

U.S. PATENT DOCUMENTS

| | | | |
|---|---|---|---|
| 2006/0224502 A1* | 10/2006 | McGowan | 705/38 |
| 2007/0083462 A1* | 4/2007 | Cubillo et al. | 705/38 |
| 2008/0052224 A1* | 2/2008 | Parker | 705/38 |
| 2008/0133391 A1* | 6/2008 | Kurian et al. | 705/35 |
| 2008/0133402 A1* | 6/2008 | Kurian et al. | 705/38 |
| 2009/0210340 A1* | 8/2009 | Mittal et al. | 705/38 |
| 2009/0271287 A1* | 10/2009 | Halpern | 705/26 |
| 2010/0005018 A1* | 1/2010 | Tidwell | 705/35 |
| 2010/0241546 A1* | 9/2010 | Thomas et al. | 705/35 |
| 2011/0112957 A1* | 5/2011 | Ingram et al. | 705/38 |
| 2011/0288988 A1* | 11/2011 | Vizcarrondo | 705/38 |
| 2012/0030091 A1* | 2/2012 | Hu et al. | 705/38 |

\* cited by examiner

*Primary Examiner* — Sara C Hamilton
(74) *Attorney, Agent, or Firm* — Michael A. Springs; Moore & Van Allen PLLC; Sreenivas Vedantam (57) ABSTRACT

A social networking platform for peer-to-peer underwriting is disclosed. A user's social network acquaintances may be contacted or otherwise polled to determine their agreeability with serving as an underwriter for the user's desired financial services in order to reduce (or eliminate) the financial risk of providing the financial services to the user by the financial services provider. With a plurality of acquaintances willing to underwrite, the financial risk may be substantially dispersed among numerous acquaintances while the user is granted their desired financial services (or a reduced rate for the financial services).

59 Claims, 5 Drawing Sheets

SOCIAL NETWORK PLATFORM FOR UNDERWRITING

BACKGROUND

Oftentimes potential borrowers find it difficult to obtain a loan or obtain credit. For instance, a bad credit history, no credit history, or unfavorable asset-to-debt ratios may make it very difficult for borrowers to obtain funds. Furthermore, major credit lenders tend to be much more cautious with lending presently in light of increasing numbers of losses due primarily to economic conditions.

Lending funds involves capital management and risk assessment. Risk varies based on a number of factors and conditions. Due to the nature of the business, major credit lenders generally evaluate the risk and approve or disapprove a lending request without actually "knowing" the individual and, indeed, usually without ever meeting or talking to the individual. Thus, if a potential borrower is evaluated as having an elevated risk, the credit lender generally has little choice other than to deny the loan application or institute some means to justify the risk such as a higher interest rate, adding or increasing payments, etc.

In contrast to loans between an individual and a major credit lender, loans made between parties personally known to each other create a certain dynamic with associated advantages. One advantage of personal lending is that the borrower often feels a personal obligation to repay the lender, in addition to the contractual obligation. Theoretically, this dynamic should substantially lower the risk of loss by taking advantage of sociological and psychological principles such as social norms and reciprocity.

Social norms define the behaviors within a group (such as a social network), i.e., the appropriate and inappropriate values, beliefs, attitudes and behaviors. Reciprocity refers to the psychological tendency to respond to a positive action with another positive action. Reciprocal actions are important to social psychology as they can help explain the maintenance of social norms.

Unfortunately, personal loans between parties are generally limited in the amount of funds capable of being loaned as compared to a major credit lender. Furthermore, borrowers often find it difficult to locate willing lenders.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the invention address the above needs and/or achieve other advantages by providing apparatuses (e.g., a system, computer program product, and/or other device), methods, or a combination of the foregoing for a social networking platform for underwriting.

In a first aspect of the invention, a social networking platform is provided. The social networking platform includes a processing device configured for receiving information relating to a financial service desired by a customer and receiving an underwriting agreement for the financial service from one or more acquaintances of the customer within the customer's social network.

In a specific embodiment of the social networking platform, the financial service may include insurance, such as in some embodiments, car insurance, in some embodiments, homeowner's insurance, in some embodiments, medical insurance, and in some further embodiments, life insurance.

In some specific embodiments of the social networking platform, the financial service may be a line of credit.

Additionally, in some specific embodiments of the social networking platform, the financial service may be a loan, such as in some embodiments, a mortgage including, for example, a home equity line of credit and, in some embodiments, an automobile loan.

In some specific embodiments of the social networking platform, the processing device is further configured for polling the customer's social network to determine acquaintances that are willing to underwrite for the financial service.

In a specific embodiment of the social networking platform, the processing device is further configured to provide potential underwriting acquaintances reliability data for the customer. In some embodiments, the reliability data may be a function of the customer's credit history.

Furthermore, in some specific embodiments of the social networking platform, the processing device is further configured to determine the essential terms of the underwriting. In some embodiments, the essential terms of the underwriting may include a specified amount or percentage of the risk allocated to the one or more acquaintances.

In a particular embodiment of the social networking platform, the one or more acquaintances are a plurality of acquaintances. In some embodiments, the risk assumed by the underwriting acquaintances is distributed among the acquaintances equally. Conversely, in some embodiments, the risk assumed by the underwriting acquaintances is distributed among the acquaintances unequally.

In a specific embodiment of the social networking platform, the processing device is further configured to alert the one or more acquaintances of a potential triggering event triggering their liability.

In some embodiments of the social networking platform, the processing device is further configured to receive or compute the overall value of risk associated with the financial service and the portion of risk subject to the underwriting. In some embodiments, the processing device is further configured to receive input from the one or more acquaintances wherein the input includes the amount or percentage of liability each acquaintance wishes to be responsible for if acquaintance liability is triggered.

In further specific embodiments of the social networking platform, the processing device is further configured to communicate with one or more third parties that are providing the financial service. In some embodiments, the processing device is further configured to generate contract terms for the agreement between the one or more third parties, the customer, and the one or more acquaintances.

In a second aspect of the invention, a method for providing a financial service is provided. The method includes receiving a request for a financial service from a customer. The method further includes evaluating the financial risk associated with providing the financial service to the customer. In addition, the method includes obtaining an underwriting agreement from one or more of the customer's acquaintances within the customers' social network to assume at least a portion of the financial risk.

In a specific embodiment of the method, the financial service may include insurance, such as in some embodiments, car insurance, in some embodiments, homeowner's insurance, in some embodiments, medical insurance, and in some further embodiments, life insurance.

In some specific embodiments of the method, the financial service may be a line of credit.

Additionally, in some specific embodiments of the method, the financial service may be a loan, such as in some embodiments, a mortgage including, for example, a home equity line of credit and, in some embodiments, an automobile loan.

In some specific embodiments, the method further includes polling the customer's social network to determine acquaintances that are willing to underwrite for the financial service.

In a specific embodiment, the method further includes providing potential underwriting acquaintances reliability data for the customer. In some embodiments, the reliability data may be a function of the customer's credit history.

Furthermore, in some specific embodiments, the method further includes determining the essential terms of the underwriting. In some embodiments, the essential terms of the underwriting may include a specified amount or percentage of the risk allocated to the one or more acquaintances.

In a particular embodiment of the method, the one or more acquaintances are a plurality of acquaintances. In some embodiments, the risk assumed by the underwriting acquaintances is distributed among the acquaintances equally. Conversely, in some embodiments, the risk assumed by the underwriting acquaintances is distributed among the acquaintances unequally.

In a specific embodiment, the method further includes alerting the one or more acquaintances of a potential triggering event triggering their liability.

In some embodiments, the method further includes receiving or computing the overall value of risk associated with the financial service and the portion of risk subject to the underwriting. In some embodiments, the method further includes receiving input from the one or more acquaintances wherein the input includes the amount or percentage of liability each acquaintance wishes to be responsible for if acquaintance liability is triggered.

In further specific embodiments, the method further includes communicating with one or more third parties that are providing the financial service. In some embodiments, the method further includes generating contract terms for the agreement between the one or more third parties, the customer, and the one or more acquaintances.

In a third aspect of the invention, a computer program product for providing a financial service is provided. The computer program product includes a non-transitory computer readable medium including computer-readable instructions. The instructions include instructions for receiving a request for a financial service from a customer, instructions for evaluating the financial risk associated with providing the financial service to the customer, and instructions for obtaining an underwriting agreement from one or more of the customer's acquaintances within the customer's social network to assume at least a portion of the financial risk.

In a specific embodiment of the computer program product, the financial service may include insurance, such as in some embodiments, car insurance, in some embodiments, homeowner's insurance, in some embodiments, medical insurance, and in some further embodiments, life insurance.

In some specific embodiments of the computer program product, the financial service may be a line of credit.

Additionally, in some specific embodiments of the computer program product, the financial service may be a loan, such as in some embodiments, a mortgage including, for example, a home equity line of credit and, in some embodiments, an automobile loan.

In some specific embodiments, the computer program product further includes instructions for polling the customer's social network to determine acquaintances that are willing to underwrite for the financial service.

In a specific embodiment, the computer program product further includes instructions for providing potential underwriting acquaintances reliability data for the customer. In some embodiments, the reliability data may be a function of the customer's credit history.

Furthermore, in some specific embodiments, the computer program product further includes instructions for determining the essential terms of the underwriting. In some embodiments, the essential terms of the underwriting may include a specified amount or percentage of the risk allocated to the one or more acquaintances.

In a particular embodiment of the computer program product, the one or more acquaintances are a plurality of acquaintances. In some embodiments, the risk assumed by the underwriting acquaintances is distributed among the acquaintances equally. Conversely, in some embodiments, the risk assumed by the underwriting acquaintances is distributed among the acquaintances unequally.

In a specific embodiment, the computer program product further includes instructions for alerting the one or more acquaintances of a potential triggering event triggering their liability.

In some embodiments, the computer program product further includes instructions for receiving or computing the overall value of risk associated with the financial service and the portion of risk subject to the underwriting. In some embodiments, the computer program product further includes instructions for receiving input from the one or more acquaintances wherein the input includes the amount or percentage of liability each acquaintance wishes to be responsible for if acquaintance liability is triggered.

In further specific embodiments, the computer program product further includes instructions for communicating with one or more third parties that are providing the financial service. In some embodiments, the computer program product further includes instructions for generating contract terms for the agreement between the one or more third parties, the customer, and the one or more acquaintances.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "financial service" may refer to any type of loan, credit, or any other type of commodity in which a financial risk of loss to the provider of the financial service is involved. For instance, a financial service may be insurance, such as car, home owner's, medical, or life insurance, a loan, such as a mortgage, home equity line of credit, car loan, personal loan, etc., a line of credit, such as a credit card, etc.

In accordance with embodiments of the invention, the terms "borrower," "customer," and "user" are used interchangeably and refer to a customer seeking a financial service.

In accordance with embodiments of the invention, the term "credit lender" and "financial service provider" are used interchangeably and may refer to any entity that provides a financial service. For instance, a credit lender may be a financial institution, an insurance broker, etc.

In accordance with embodiments of the invention, the term "underwrite" or "underwriting" refers to the process in which a third party agrees to assume at least a portion of the financial risk involved with a financial service provided to a borrower. Essentially, the underwriting party insures the credit lender (financial service provider) that they will cover all or a portion of the financial loss that the credit lender may incur in the event of an event triggering the financial loss.

In accordance with embodiments of the invention, the term "acquaintance" or "acquaintances" refers to a party that the borrower is connected to via a social network. The acquaintance may be a friend, family member, indirect friend (i.e. "friend of a friend"), etc. so long as the acquaintance has at least some type (no matter how minor) of connection to the borrower.

In accordance with embodiments of the invention, a "social network" is a social structure made up of individuals (or organizations) which are connected by one or more specific types of interdependency, such as friendship, kinship, common interest, financial exchange, dislike, relationships, beliefs, knowledge, prestige, etc. The social network may be web-based social structure or a non-web-based social structure. In some embodiments, the social network may be inferred from financial transaction behavior, mobile device behaviors, etc. The social network may be a network unique to the invention or may incorporate already-existing social networks as well as a plethora of web logs or "blogs," forums and other social spaces.

In accordance with embodiments of the invention, the term "reliability data" may refer to any type of data that measures the worthiness of the borrower to not default or trigger any other sort of event that leads to liability of the underwriting parties. For instance, a common reliability data tool includes a credit history, which may include a credit score.

In accordance with embodiments of the invention, the terms "risk" or "financial risk" refers to the risk of a borrower incurring a loss or otherwise triggering liability of the underwriter(s).

In accordance with embodiments of the invention, the term "triggering event" refers to the event in which liability of the underwriting parties is triggered. For example, the triggering event on a personal loan would generally be when the borrower incurred a loss on the loan, and thus each underwriter would be responsible for their contracted-for share of the financial risk.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In general, embodiments of the invention relate to apparatuses, methods and computer program products for a social networking platform for underwriting. Numerous users in need of financial services find themselves being denied for services or forced to pay exorbitantly for the services. In some instances, such troubles are a result of being evaluated as an elevated risk for financial loss by the financial service provider. Unfortunately, most service providers are incapable of taking into account the "intangibles" associated with a user because there is no personal connection with the user in most situations. Oftentimes, users are forced to forego the desired financial services. In some cases, this may cause the users financial and/or emotional hardship.

In recognition of the above, generally, the invention provides a social networking platform for peer-to-peer underwriting. Social network acquaintances may be contacted or otherwise polled to determine their agreeability with serving as an underwriter for the user's desired financial services in order to reduce (or eliminate) the financial risk of providing the financial services to the user by the provider. With a plurality of acquaintances willing to underwrite, the financial risk may be substantially dispersed among numerous acquaintances so that no acquaintances are subject to substantial potential liability while the user is granted their desired financial services (or a reduced rate for the financial services).

Figure 1:
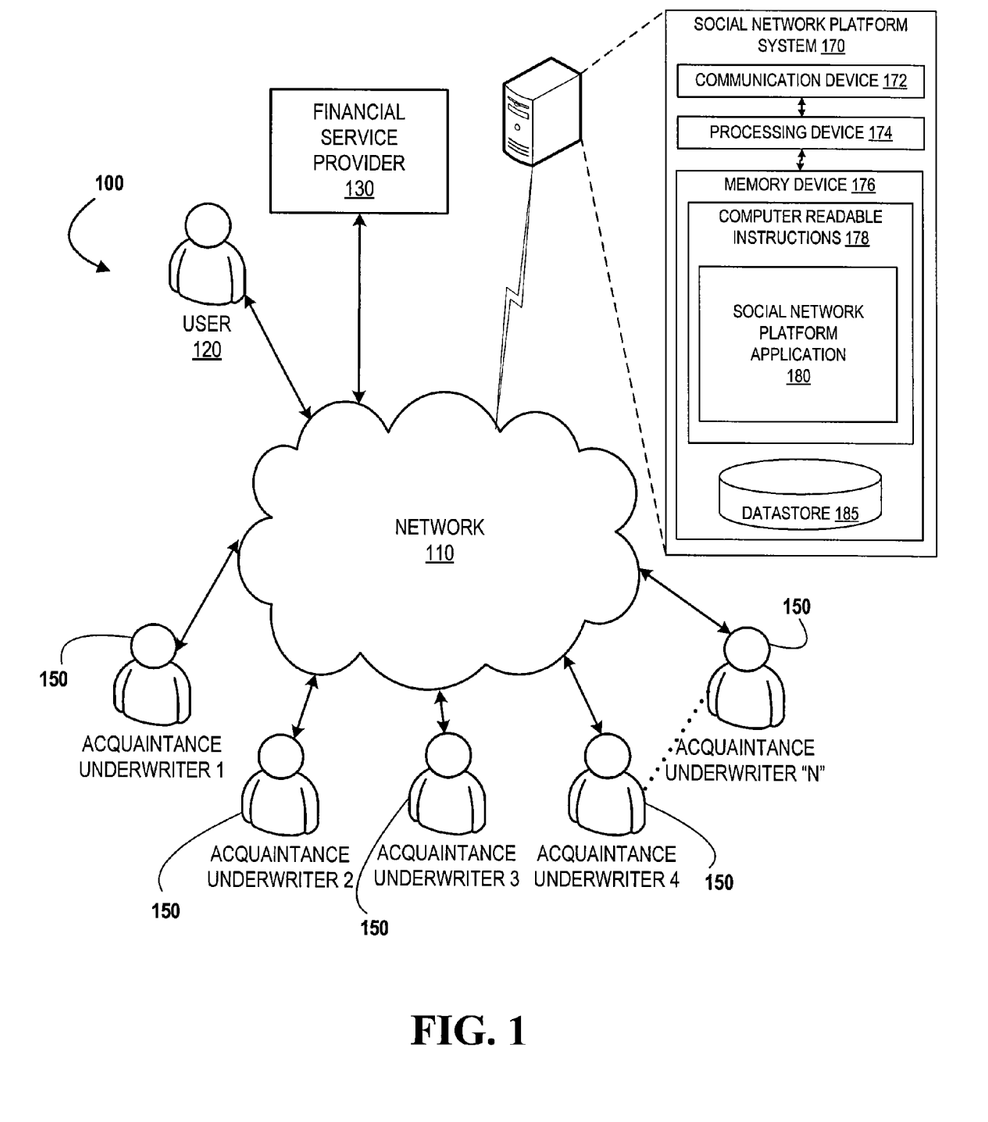
FIG. 1 is a block diagram illustrating a financial service transaction environment, in accordance with embodiments of the invention.

Referring to FIG. 1, a block diagram illustrates a financial services transaction environment 100 configured for transacting across a network 110 according to embodiments of the invention. As illustrated, the financial services transaction environment 100 includes one or more users, such as user 120 (i.e., the customer/borrower) who wishes to obtain a financial service from the financial service provider 130 through a network 110 connecting at least one acquaintance underwriter 150 to the transaction.

In FIG. 1, the network 110 may include a local area network (LAN), a wide area network (WAN), and/or a global area network (GAN). The network 110 may provide for wireline, wireless, or a combination of wireline and wireless communication between communication devices in the network. The network 110, in some embodiments, includes the Internet.

The financial service provider 130 may provide any financial service such as any type of loan, credit, or any other type of commodity in which a financial risk of loss to the provider 130 for the financial service is involved. For instance, in one embodiment, the financial service is insurance. Insurance is a form of risk management primarily used to hedge against the risk of a contingent, uncertain loss. Insurance is defined as the equitable transfer of the risk of a loss, from one entity to another, in exchange for payment. An insurer (financial service provider 130) is generally a company selling the insurance. An insured, or policyholder, is the person or entity buying the insurance policy. The insurance rate is a factor used to determine the amount to be charged for a certain amount of insurance coverage, which, in some embodiments, includes or is a premium. Risk management, the practice of appraising and controlling risk, has evolved as a discrete field of study and practice.

The transaction involves the insured assuming a guaranteed and known relatively small loss in the form of payment to the insurer in exchange for the insurer's promise to compensate (indemnify) the insured in the case of a financial (personal) loss. The insured receives a contract, called the insurance policy, which details the conditions and circumstances under which the insured will be financially compensated.

Insurance brokers utilize any number of factors in evaluating the "risk" associated with an insurance policy. The amount of risk for a policy as evaluated by a broker is of course dependent upon the type of insurance involved. For instance, the risk involved with a life insurance policy may be heavily dependent upon the user's age and health. For instance, a 30 year old in perfect health would be evaluated as extremely low risk for a 10 year term life insurance policy. Alternatively, a 50 year old that has smoked his whole life, has diabetes, and is obese would be evaluated as a high risk for a 10year term life insurance policy.

Thus, in the example above, the 50 year old may not qualify for a life insurance policy at all, and if he did, the premiums would be astronomical compared to the 30 year old in perfect health. With a social networking platform for underwriting, as in the invention, the 50 year old may be able to afford the life insurance his family needs if a plurality of acquaintances elected to underwrite his policy to alleviate much of the risk from the policy, for instance, bring the 50 year old's premiums down to comparable with the 30 year old in perfect health. Insurance companies, in various embodiments, have formulas to calculate a "risk" value for offering the 50 year old a policy at the 30 year old's premiums. That risk can be underwritten and spread across a plurality of acquaintance underwriters 150. In theory, the 50 year old may be further motivated to live a healthier life in order to prevent a burden on the acquaintances electing to underwrite his life insurance policy, and who, thereby, facilitated the user's approval for the insurance.

Similarly, in various embodiments of the invention, health insurance premiums are underwritten such that an individual or family receives reduced health premiums, therefore making health insurance more affordable for them. In such cases, insurance companies may devise a formula for determining at what point in health care costs the individual or family begins to exceed the value point of the reduced premium price. Once the triggering event (e.g., exceeding a certain cost amount in health care) occurs, the acquaintance underwriters 150 may become responsible for the "risk" amount determined. In theory, the individual or family would only utilize healthcare in emergencies in order to prevent burdening the acquaintance underwriters 150.

The evaluated risk for an auto insurance policy, for example, would likely be heavily dependent upon the value of the automobile, the driving record of the driver, and the age and sex of the driver. Utilizing a social networking platform for underwriting, a user could disperse some of the "risk" evaluated by the insurance broker across a plurality of social network acquaintances. Further, using the social networking platform for underwriting, the user may receive some incentives for behavior modification. For example, for fear of burdening the user's acquaintance underwriters, the user may, in theory, be a safer driver.

Similarly, for a homeowner's insurance policy, the evaluated risk would likely be dependent upon the age of the house, the safety features included in the house, and, of course, the value of the house. As with the insurance policies discussed above, a homeowner's insurance premiums may be lowered by offloading some of the risk to agreeable acquaintances in a social network. In theory, the homeowner may be more safety-conscious in the home in order to prevent burdening their acquaintances.

In another embodiment, the financial service is a loan. A loan is the simplest embodiment to best illustrate the benefits of the invention. Generally, the primary means for evaluating the risk for a loan is evaluating the user's credit history and assets-to-liabilities ratio. With even marginal risk evaluations, a user may be denied a loan or assessed elevated interest rates. Of course, there are various types of loans including secured loans such as mortgages (including home equity lines of credit) and automobile loans, as well as unsecured loans such as a personal loan. However, for the purposes of this discussion, most types of loans could be underwritten utilizing the social network platform for underwriting of the invention in order to reduce interest rates or simply to obtain the loans. The "risk" for the loans, in some embodiments, may be calculated to be the full principal amount loaned in an unsecured loan and the deficiency amount (if any) if liquidated upon and sold in a secured loan. In some embodiments, the system disperses the risk value among a plurality of acquaintance underwriters 150. In theory, the user should feel an obligation that extends beyond mere contractual obligation to repay the loan since a loss would place the user's acquaintances "on the hook" for repayment.

In another embodiment, the financial service may be a line of credit, such as, for instance, a credit account associated with a credit card. Similar to the loan noted above, in some embodiments, the system calculates the maximum risk to be a loss on a credit maximum. With acquaintance underwriters 150 alleviating the financial service provider 130 from the risk and dispersing the risk amongst themselves, the user 120 may receive an exemplary interest rate, for instance. Further, in theory, a user 120 would be less likely to incur a loss for fear of burdening their acquaintances.

As illustrated in FIG. 1, the financial services transaction environment 100 may include any number of acquaintance underwriters 150. While "N" number of acquaintance underwriters 150 is illustrated, it should be noted that "N" may be any whole number. Generally speaking, the number of acquaintance underwriters 150 will be between 1 and 500, in some embodiments between 2 and 200, and in some embodiments 100 or less. Again, however, there may be any number of underwriters 150, but as a practical matter, the vast majority of users 120 seeking acquaintance underwriters 150 will not have such a large social network that a large number (e.g., greater than 500) of acquaintances will be willing to subject themselves to potential liability.

In terms of minimizing the average risk per acquaintance underwriter, it may be preferable to get as many acquaintances to agree to underwrite as possible. For example, if a user 120 defaults on a $10,000 loan and there are ten underwriters 150 the underwriters 150 are responsible for an average of $1,000 each. In contrast, if the $10,000 loan has one hundred underwriters 150, then the average liability of each underwriter 150 is only $100.

The above example utilizes the "average" responsibility for each underwriter 150 because it is not necessary that each underwriter 150 have the same amount or percentage of the total liability if the user 120 triggers acquaintance liability (e.g. by incurring a loss on a loan). In one embodiment, the acquaintances may select the maximum amount of liability they wish to potentially subject themselves too. For instance, the user's sister may opt to "bid" a maximum of $1,000 (or 10%) for the user's $10,000 loan whereas the user's cousin may only wish to "bid" a maximum of $100 (or 1%) for the user's $10,000 loan. In one embodiment, the financial service provider 130 will not provide the financial service to the user 120 until the specified amount of "risk" is accounted for by the acquaintance underwriters 150. In an alternate embodiment, once the user 120 has exhausted the number of acquaintance underwriters 150 he can obtain, the financial service provider 130 may determine that the remaining amount of risk is acceptable and elect to issue the financial service. Alternatively, the financial service provider 130 may attempt to further account for the risk by assessing increased payments, higher interest rates, etc.

In some embodiments, the underwriters' risk may be mitigated by securing at least a portion of the loan or other financial service with some type of collateral owned by the user 120. Generally speaking, the user 120 will not be required to provide collateral unless the loan or other financial service exceeds a predetermined threshold where the risk may be too great for the underwriters 150 to perform the desired financial service absent securing at least a portion of the loan or other financial service.

Furthermore, in some embodiments, acquaintances within the social network may contribute to a reserve pool from which users 120 may draw from as needed. Such a pooling of funds diversifies the risk of each contributing acquaintance as the amount contributed by each acquaintance may be spread over a plurality of borrowers to minimize acquaintance liability.

Similarly, in some embodiments, a user's identity may be hidden from potential underwriters 150. Generally, in such embodiments, an underwriter 150 is less likely to risk a substantial amount of funds; however, simply the fact that the user 120 is within the social network may lead underwriters 150 to accept some amount of risk in the transaction.

Of note, the acquaintances discussed above have been described as individual people. However, in some embodiments, the acquaintance may be a different entity. In some embodiments, it may be desirable that the entity have a substantial connection to the user. For instance, a user's employer may elect to be one of the acquaintance underwriters 150. It is desirable that there be a personal connection with the acquaintances in order to take advantage of the personal obligation most users 120 should feel not to subject "acquaintances" to liability. Thus, the obligation not to incur a loss or otherwise trigger acquaintance liability provides extra incentive to the user 120 over simple contractual obligations.

In addition, as illustrated, a social network platform system 170 is generally present within the financial services transaction environment 100. The social network platform system 170 may, in various embodiments be configured for performing one or more of the steps and/or sub-steps discussed with reference to FIGS. 3-4 below and/or one or more additional steps and/or sub-steps. In the configuration shown, the social network platform system 170 communicates across the network 110 with one or more remote devices, such as workstation (not shown) that may be operated by one or more of the acquaintance underwriters 150, the user 120, or the financial service provider 130. The user 120, acquaintance underwriter 150, or financial service provider 130 can interact with the social network platform system 170 using a variety of devices remote to the social network platform system 170. Furthermore, in some embodiments one or more entities can interact with the social network platform system 170 locally such as through an input/output device attached directly with the social network payment settlement system 170.

FIG. 1 illustrates a single financial service provider 130 in communication with the social network platform system 170. It will be understood, however, that any number of users 120, underwriters 150, and financial service providers 130 may be present within the network 110. Indeed, in some embodiments, a plurality of financial service providers 130 are in communication with the network 110 and are capable of providing services to one or more users 120. In some embodiments, the financial service providers 130 may submit bids to a user 120 in an attempt to provide the desired financial service. In a particular embodiment, one financial service provider 130 provides the infrastructure platform and service of the social network platform system 170.

In some embodiments, the user 120, acquaintance underwriters 150, financial service providers 130, or any other individual or entity within the network 110, may communicate with the network 110 via a mobile device. A "mobile device" may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The social network platform system 170, in various embodiments, has a communication device 172 controlled by a processing device 174 in order to communicate across the network 110. As noted above, the network 110 is an intranet, the Internet, a local area network, a wide area network, and/or any other electronic device network, and/or any combination of the same. The processing device 174 is also in communication with a memory device 176 configured for storing computer-readable and computer-executable instructions 178. The computer-readable instructions, in various embodiments, include one or more applications, such as a social network platform application 180.

Generally, in some embodiments, some, all or none of the method steps and/or sub-steps discussed below with reference to FIGS. 3, 4 and/or 5 are embodied in computer-executable instructions within the social network platform application 180. In some embodiments, one or more applications are contained within a single social network platform application 180, and in other embodiments, the instructions for executing the method steps disclosed herein are spread over two or more applications. In some embodiments, some of the instructions for executing the methods disclosed herein are stored on the social network platform system 170 and some of the instructions are stored on a user device. In some embodiments, some or all the instructions are stored remotely from the social network platform system 170 and accessed as necessary by the social network platform system 170 and/or any other device requiring instructions. Further, in some embodiments, the memory device 176 includes a datastore 185 or database configured for storing information and/or data. In other embodiments, the datastore 185 is housed remotely from the social network platform system 170 and the social network platform system 170 is in communication with the datastore 185 across the network 110 and/or across some other communication link.

In some embodiments one or more additional systems or servers are configured for communicating with the social network platform system 170. In some such embodiments, information regarding different users 120 and/or acquaintance underwriters 150 may be stored in various locations on different systems. In some embodiments, information regarding one user's 120 financial accounts, social networks, funds sharing networks and the like may be stored on separate systems or datastores. In some embodiments, a social network payment settlement system 170 functions as a central control server and accesses the various pieces of customer information from various locations. In various other embodiments, multiple servers or systems functions together as a central control server and access different pieces of data and/or instructions in order to perform one or more of the method steps discussed herein.

Figure 2:
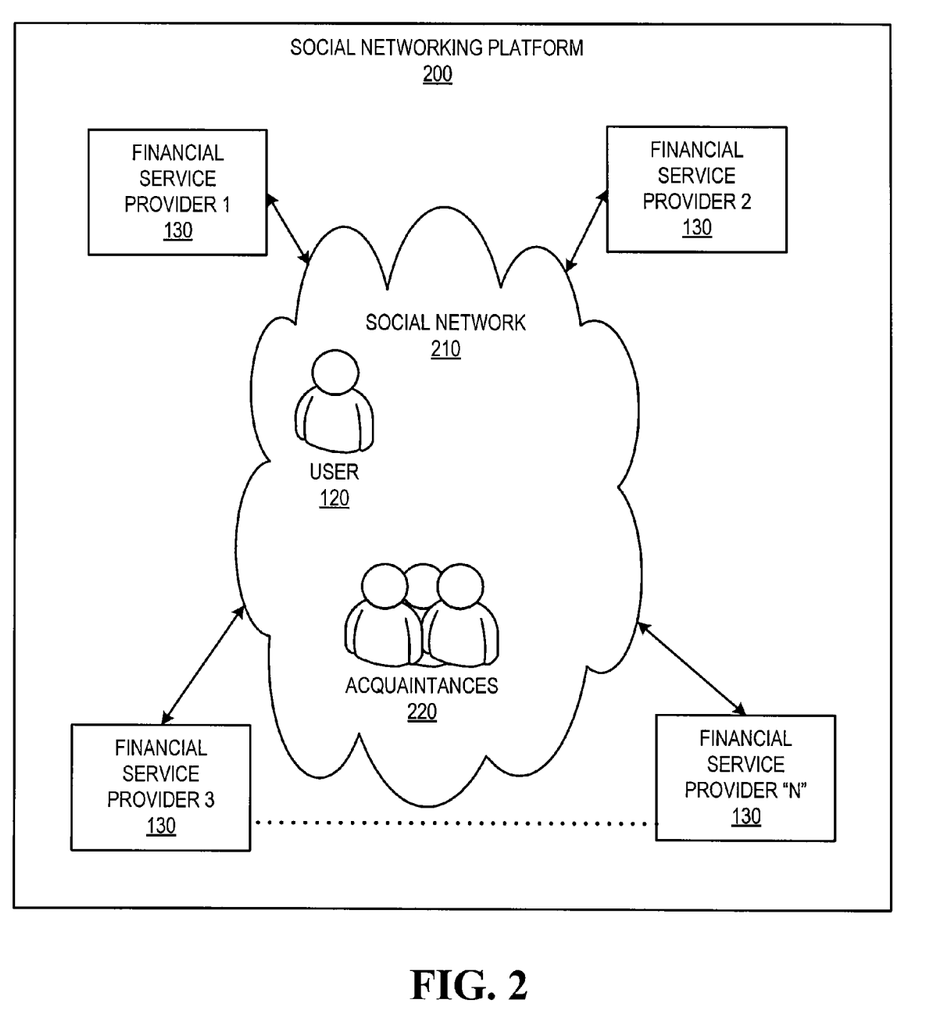
FIG. 2 is a block diagram illustrating a social networking platform, in accordance with embodiments of the invention.

Referring now to FIG. 2, a block diagram illustrates a social networking platform 200 according to embodiments of the invention. In some embodiments, the social networking platform 200 includes the user's social network 210. For example, the user's social network may include a plurality of acquaintances 220. While a single social network 210 is illustrated, it will be appreciated that the social networking platform 200 may include a plurality of different social networks that the user belongs to. Also illustrated within the social networking platform 200 are "N" number of financial service providers 130. It will be appreciated that any number of financial service providers 130 may be present within the social networking platform 200 and many different types of services may be provided by various providers 130 such as insurance, loans, lines of credit, etc.

The process for reaching an agreement to provide the user with a financial service that is underwritten by acquaintances 220 may proceed by any means that properly brings the parties together in an agreement. For instance, in one embodiment, the user may select a particular financial service provider 130 and request information regarding the terms in which the provider 130 would offer its services to the user. The provider 130, with the user's consent, may then poll some or all of the acquaintances within the user's social network to determine how much (if any) risk the acquaintances 220 are willing to underwrite.

In another embodiment, the user 120 may generally make it known the type of financial service he desires. The financial service providers 130 may then make competing offers and the user 120 may select the most favorable offer. Then the acquaintances may be contacted to determine how much risk may be underwritten.

In still a further embodiment, the user may elect to determine how many (and how much risk) his acquaintances 220 within his social network 210 would be willing to underwrite for him for a desired financial service. After obtaining agreements with one or more acquaintances to underwrite, the user 120 may then advertise to receive competing offers or select one or more financial service providers 130 to approach with an offer for the desired financial services. One of the advantages to this embodiment would be essentially that the user 120 could be "pre-approved" by obtaining enough underwriting agreements prior to even contacting a financial service provider 130.

Of note, it is contemplated herein that acquaintances that elect to underwrite a user 120 receive no benefits for accepting risk other than to assist a user 120 within their social network. However, in some embodiments, the financial service provider 130 or the user 120 may compensate the underwriting acquaintances 150 for accepting risk. Thus, in such embodiments, underwriting acquaintances 150 may utilize the social network platform system 170 as an investment tool.

Figure 3:
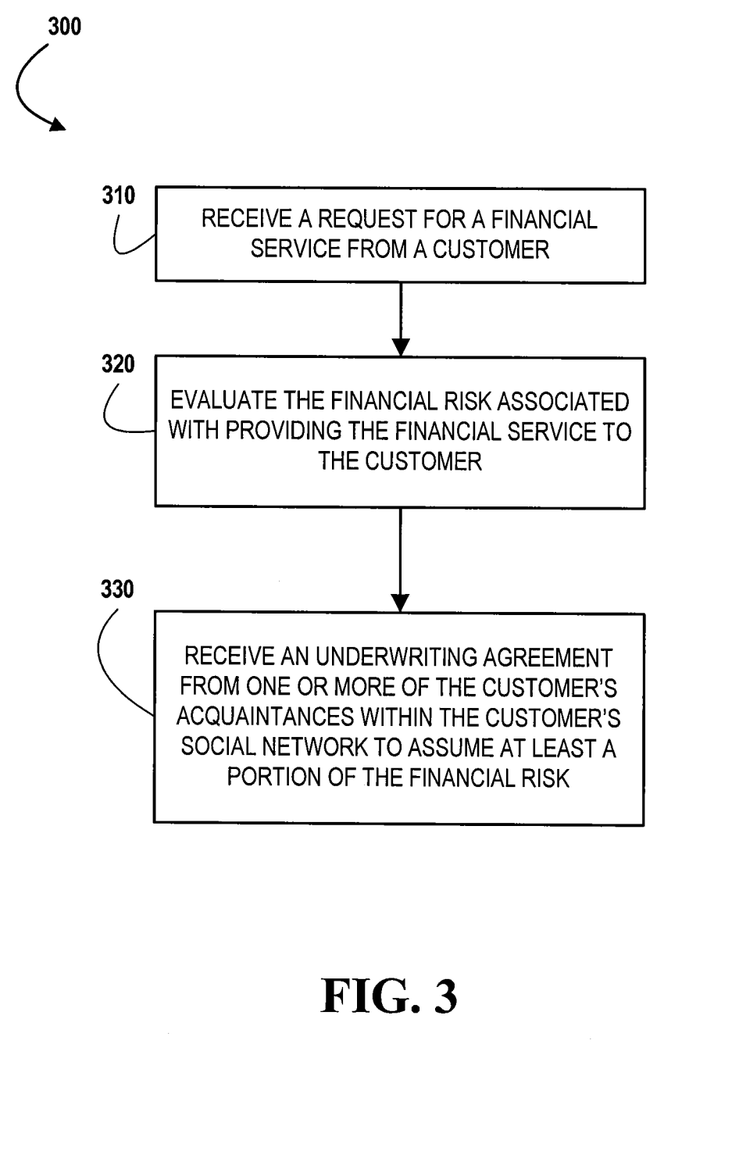
FIG. 3 is a high level flow diagram of a method for providing a financial service, in accordance with an embodiment of the invention.

FIG. 3 illustrates a high level flow diagram of a method 300 for providing a financial service. At block 310, a request is received from a customer requesting a financial service. As discussed above, the financial service may be any type of service in which a financial risk of loss to the provider of the financial service is involved. For instance, a financial service may be insurance, such as car, home owner's, medical, or life insurance, a loan, such as a mortgage, home equity line of credit, car loan, personal loan, etc., a line of credit, such as a credit card, etc.

At block 320, the financial service provider evaluates the financial risk associated with providing the financial service to the customer. The provider may evaluate the risk by any necessary means. For instance, for financial services involving loans, generally, the user's credit history is a significant tool for evaluating the risk associated with the service. On the other hand, credit history is relied upon much less for financial services such as insurance. For example, automobile insurance risk evaluation may weigh heavily on a user's driving record, the value of the automobile, the age of the driver, the sex of the driver, etc.

After evaluating the financial risk associated with providing the financial service to the customer, as represented by block 330, the financial provider may receive an underwriting agreement from one or more of the customer's acquaintances within the customer's social network to assume at least a portion of the financial risk. As noted previously, ideally, as many underwriting acquaintances as possible is desired in order to minimize the risk associated with each of the acquaintance underwriters. With the required amount of risk underwritten, the financial service provider may perform the requested financial service. In some embodiments, the financial service provider will not perform the requested service until the risk is underwritten sufficiently. In other embodiments, the financial service provider may offer the service at a discounted rate reflective of the decrease in risk to the service provider.

Figure 4:
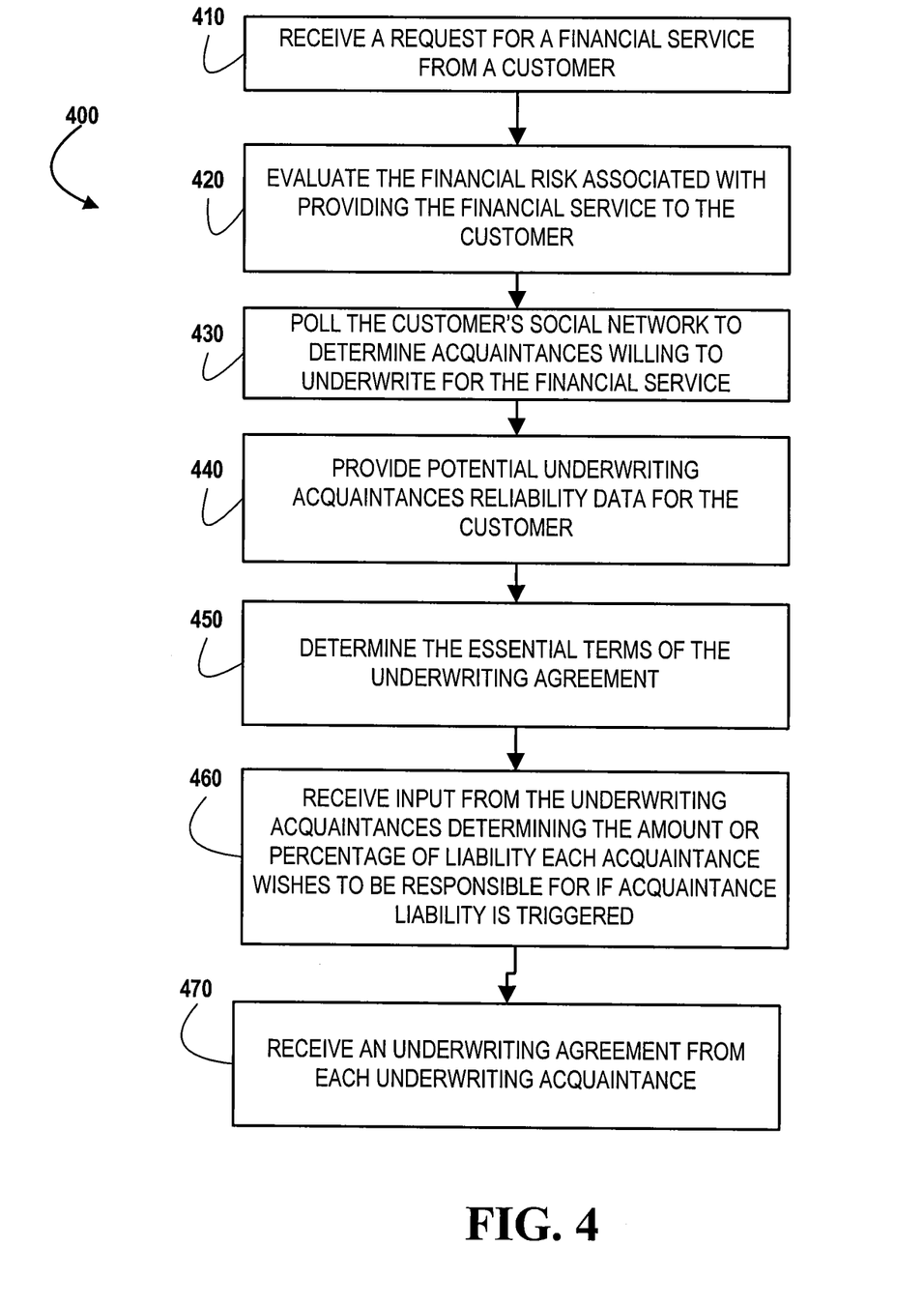
FIG. 4 is a high level flow diagram of a method for providing a financial service, in accordance with an embodiment of the invention.
Figure 5:
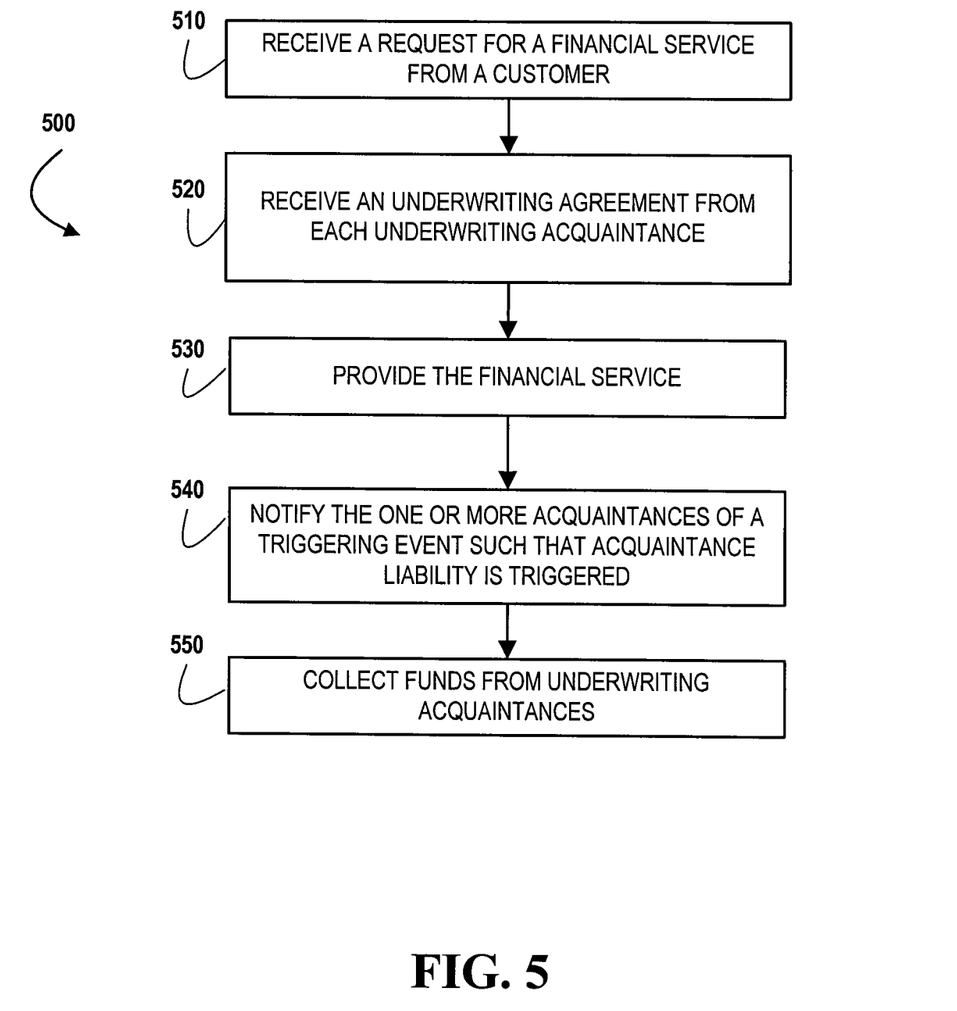
FIG. 5 is a high level flow diagram of a method for providing a financial service, in accordance with an embodiment of the invention.

FIG. 4 illustrates a high level flow diagram of a method 400 for providing a financial service. At block 410, a request is received from a customer requesting a financial service. After receiving the request, as represented by block 420, the financial service provider may evaluate the financial risk associated with providing the financial service to the customer.

After evaluating the risk, at block 430, the service provider, or in some embodiments, the customer, may poll the user's social network to determine the number of acquaintances willing to underwrite for the financial service as well as the amount of overall risk the group of underwriting acquaintances wish to be responsible for. The polling may be accomplished by any means that results in the obtaining the desired information. In one embodiment, the financial service provider may send a private message to all or just selected members of the user's social network and explain the requested financial service and terms of the potential agreement. The acquaintances may respond with the amount of risk they wish to underwrite. In an alternative embodiment, the user may simply post publicly on the social network the financial service desired and acquaintances may respond with how much risk they are willing to underwrite. Of note, similarly, in the embodiment that the user publicly declares the financial service he desires, multiple financial service providers may "bid" and make competing offers to the user in order. For example, one provider may provide the service for the same terms as another provider except that they require less underwriting.

At block 440, reliability data for the customer may be relayed to some or all potential underwriting acquaintances in order to assist the acquaintances in their decision of whether or not to underwrite. Reliability data may be any type of data that may assist an acquaintance in determining whether or not to underwrite. In one embodiment, the reliability data is a function of a user's credit history (e.g., credit score). For example, in an embodiment where the financial service is health insurance or life insurance, the reliability data may include medical data relating to the perceived health of the user.

The essential terms of the underwriting agreement may then be determined at block 450. The essential terms will generally include the costs, payback schedules, etc. to the user and the risk required by the financial service provider to be underwritten. Then, at block 460, the provider may receive input from underwriting acquaintances determining the amount or percentage of risk liability each acquaintance wishes to be responsible for if acquaintance liability is triggered.

Finally, as represented by block 470, the financial service provider may receive an underwriting agreement from one or more of the customer's acquaintances within the customer's social network to assume at least a portion of the financial risk. With the required amount of risk underwritten, the financial service provider may perform the requested financial service.

Turning now to FIG. 5, illustrated is a high level flow diagram of a method 500 for providing a financial service. At block 510, a request is received from a customer requesting a financial service. As represented by block 520, the financial service provider may receive an underwriting agreement from one or more of the customer's acquaintances within the customer's social network to assume at least a portion of the financial risk. With the required amount of risk underwritten, the financial service provider may perform the requested financial service, illustrated by block 530.

At block 540, the underwriting acquaintances may be notified of a triggering event such that acquaintance liability is triggered. The financial service provider may then seek to collect from the underwriting acquaintances for the amount each underwriting acquaintance is apportioned based on the underwriting agreement. Finally, as represented by block 550, funds may be collected from the underwriting acquaintances.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the invention, however, the computer-readable medium may be transitory, such as, for example, a propagation signal including computer-executable program code portions embodied therein.

One or more computer-executable program code portions for carrying out operations of the invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the invention are written in conventional procedural programming languages, such as the "C" programming languages and/or similar programming languages. The computer program code may alternatively or additionally be written in one or more multi-paradigm programming languages, such as, for example, F#.

Some embodiments of the invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a social networking platform for underwriting comprising:
    a processing device configured to:
        receive a request for a financial service from a customer, the request being received via the customer's social network;
        evaluate the financial risk associated with providing the financial service to the customer;
        after receiving the request, request the customer's consent for polling the customer's social network;
        in response to receiving the customer's consent, poll the customer's social network to determine one or more acquaintances associated with the customer willing to enter an underwriting agreement to assume at least a portion of the financial risk associated with providing the financial service to the customer;
        receive the underwriting agreement from the one or more acquaintances;
        prior to contacting at least one financial service provider, obtain pre-approval for the requested financial service based on the received underwriting agreement from the one or more acquaintances;
        contact at least one financial service provider after obtaining pre-approval for the requested financial service;
        provide an offer associated with the requested financial service to the customer, wherein the offer is associated with the at least one contacted financial service provider; and
        alert, via the social networking platform, the one or more acquaintances of a potential triggering event triggering their liability.

2. The system of claim 1, wherein the financial service is insurance.

3. The system of claim 2, wherein the insurance comprises car insurance, homeowner's insurance, medical insurance, life insurance, or combinations thereof.

4. The system of claim 1, wherein the financial service is a line of credit.

5. The system of claim 1, wherein the financial service is a loan.

6. The system of claim 5, wherein the loan is a personal unsecured loan, a mortgage, or an automobile loan.

7. The system of claim 6, wherein the loan is a mortgage and the mortgage is a home equity line of credit.

8. The system of claim 1, wherein the customer posts the financial service on the customer's social network.

9. The system of claim 1, wherein the processing device is further configured to provide reliability data for the customer to the one or more acquaintances.

10. The system of claim 9, wherein the reliability data is a function of the customer's credit history.

11. The system of claim 1, wherein the processing device is further configured to determine essential terms of the underwriting agreement.

12. The system of claim 11, wherein the essential terms of the underwriting agreement include a specified amount or percentage of the financial risk allocated to the one or more acquaintances.

13. The system of claim 1, wherein the one or more acquaintances are a plurality of acquaintances.

14. The system of claim 13, wherein the risk assumed by the underwriting acquaintances is distributed among the acquaintances equally.

15. The system of claim 13, wherein the financial risk assumed by the one or more acquaintances is distributed among the one or more acquaintances unequally.

16. The system of claim 1, wherein the processing device is further configured to receive or compute an overall value of the financial risk associated with the financial service and a portion of the overall value of the financial risk subject to the underwriting agreement.

17. The system of claim 16, wherein the processing device is further configured to receive input from the one or more acquaintances, the input comprising an amount or percentage of liability each acquaintance wishes to be responsible for if acquaintance liability is triggered.

18. The system of claim 1, wherein the processing device is further configured to communicate with the at least one financial service provider providing the financial service.

19. The system of claim 18, wherein the processing device is further configured to generate contract terms for the underwriting agreement between the at least one financial service provider, the customer, and the one or more acquaintances.

20. A method for providing a financial service, the method comprising:
    receiving a request for a financial service from a customer, the request being received via the customer's social network;
    evaluating, by a computer processing device, financial risk associated with providing the financial service to the customer;
    after receiving the request, requesting the customer's consent for polling the customer's social network;
    in response to receiving the customer's consent, polling the customer's social network to determine one or more acquaintances associated with the customer willing to enter an underwriting agreement to assume at least a portion of the financial risk associated with providing the financial service to the customer;
    receiving the underwriting agreement from the one or more acquaintances;
    prior to contacting at least one financial service provider, obtaining pre-approval for the requested financial service based on the received underwriting agreement from the one or more acquaintances;

contacting at least one financial service provider after obtaining pre-approval for the requested financial service;

providing an offer associated with the requested financial service to the customer, wherein the offer is associated with the at least one contacted financial service provider; and alerting, via the social networking platform, the one or more acquaintances of a potential triggering event triggering their liability.

21. The method of claim 20, wherein the financial service is insurance.

22. The method of claim 21, wherein the insurance comprises car insurance, homeowner's insurance, medical insurance, life insurance, or combinations thereof.

23. The method of claim 20, wherein the financial service is a line of credit.

24. The method of claim 20, wherein the financial service is a loan.

25. The method of claim 24, wherein the loan is a personal unsecured loan, a mortgage, or an automobile loan.

26. The method of claim 25, wherein the loan is a mortgage and the mortgage is a home equity line of credit.

27. The method of claim 20, wherein the customer posts the financial service on the customer's social network.

28. The method of claim 20, further comprising providing reliability data for the customer to the one or more acquaintances.

29. The method of claim 28, wherein the reliability data is a function of the customer's credit history.

30. The method of claim 20, further comprising determining essential terms of the underwriting agreement.

31. The method of claim 30, wherein the essential terms of the underwriting agreement include a specified amount or percentage of the financial risk allocated to the one or more acquaintances.

32. The method of claim 20, wherein the one or more acquaintances are a plurality of acquaintances.

33. The method of claim 32, wherein the financial risk assumed by the underwriting acquaintances is distributed among the acquaintances equally.

34. The method of claim 32, wherein the financial risk assumed by the one or more acquaintances is distributed among the one or more acquaintances unequally.

35. The method of claim 20, further comprising receiving or computing an overall value of the financial risk associated with the financial service and a portion of the overall value of the financial risk subject to the underwriting agreement.

36. The method of claim 35, further comprising receiving input from the one or more acquaintances, the input comprising an amount or percentage of liability each acquaintance wishes to be responsible for if acquaintance liability is triggered.

37. The method of claim 20, further comprising communicating with the at least one financial service provider providing the financial service.

38. The method of claim 37, further comprising generating contract terms for the underwriting agreement between the at least one financial service provider, the customer, and the one or more acquaintances.

39. A computer program product for providing a financial service, the computer program product comprising a non-transitory computer readable medium comprising computer-readable instructions, the instructions comprising:

instructions for receiving a request for a financial service from a customer, the request being received via the customer's social network;

instructions for evaluating financial risk associated with providing the financial service to the customer;

after receiving the request, instructions for requesting the customer's consent for polling the customer's social network;

in response to receiving the customer's consent, instructions for polling the customer's social network to determine one or more acquaintances associated with the customer willing to enter an underwriting agreement to assume at least a portion of the financial risk associated with providing the financial service to the customer;

instructions for obtaining the underwriting agreement from the one or more acquaintances;

prior to contacting at least one financial service provider, instructions for obtaining pre-approval for the requested financial service based on the obtained underwriting agreement from the one or more acquaintances;

instructions for contacting at least one financial service provider after obtaining pre-approval for the requested financial service;

instructions for providing an offer associated with the requested financial service to the customer, wherein the offer is associated with the at least one contacted financial service provider; and instructions for alerting, via the social networking platform, the one or more acquaintances of a potential triggering event triggering their liability.

40. The computer program product of claim 39, wherein the financial service is insurance.

41. The computer program product of claim 40, wherein the insurance comprises car insurance, homeowner's insurance, medical insurance, life insurance, or combinations thereof.

42. The computer program product of claim 39, wherein the financial service is a line of credit.

43. The computer program product of claim 39, wherein the financial service is a loan.

44. The computer program product of claim 43, wherein the loan is a personal unsecured loan, a mortgage, or an automobile loan.

45. The computer program product of claim 44, wherein the loan is a mortgage and the mortgage is a home equity line of credit.

46. The computer program product of claim 39, wherein the customer posts the financial service on the customer's social network.

47. The computer program product of claim 39, further comprising instructions for providing reliability data for the customer to the one or more acquaintances.

48. The computer program product of claim 47, wherein the reliability data is a function of the customer's credit history.

49. The computer program product of claim 39, further comprising instructions for determining essential terms of the underwriting agreement.

50. The computer program product of claim 49, wherein the essential terms of the underwriting agreement include a specified amount or percentage of the financial risk allocated to the one or more acquaintances.

51. The computer program product of claim 39, wherein the one or more acquaintances are a plurality of acquaintances.

52. The computer program product of claim 51, wherein the financial risk assumed by the underwriting acquaintances is distributed among the acquaintances equally.

53. The computer program product of claim 51, wherein the financial risk assumed by the one or more acquaintances is distributed among the one or more acquaintances unequally.

54. The computer program product of claim 39, further comprising instructions for receiving or computing an overall value of the financial risk associated with the financial service and a portion of the overall value of the financial risk subject to the underwriting agreement.

55. The computer program product of claim 54, further comprising instructions for receiving input from the one or more acquaintances, the input comprising an amount or percentage of liability each acquaintance wishes to be responsible for if acquaintance liability is triggered.

56. The computer program product of claim 39, further comprising instructions for communicating with the at least one financial service provider providing the financial service.

57. The computer program product of claim 56, further comprising instructions for generating contract terms for the underwriting agreement between the at least one financial service provider, the customer, and the one or more acquaintances.

58. A method for providing a financial service, the method comprising:
  receiving a request for a financial service from a customer, the request being received via the customer's social network;
  evaluating, by a computer processing device, financial risk associated with providing the financial service to the customer;
  after receiving the request, requesting the customer's consent for polling the customer's social network;
  in response to receiving the customer's consent, polling the customer's social network to determine one or more acquaintances associated with the customer willing to enter an underwriting agreement to assume at least a portion of the financial risk associated with providing the financial service to the customer;
  providing, via the social networking platform, reliability data for the customer to the one or more acquaintances;
  determining essential terms of the underwriting agreement;
  receiving input from the one or more acquaintances for determining an amount or percentage of liability each acquaintance wishes to be responsible for if a triggering event triggers acquaintance liability;
  receiving an underwriting agreement from the one or more acquaintances to assume at least a portion of the financial risk;
  prior to contacting at least one financial service provider, obtaining pre-approval for the financial service based on the received underwriting agreement from the one or more acquaintances;
  contacting at least one financial service provider after obtaining pre-approval for the financial service;
  providing an offer associated with the requested financial service to the customer, wherein the offer is associated with the at least one contacted financial service provider; and
  alerting, via the social networking platform, the one or more acquaintances of a potential triggering event triggering their liability.

59. The method of claim 58, wherein the reliability data is a function of the customer's credit history.

* * * * *